UNITED STATES PATENT OFFICE.

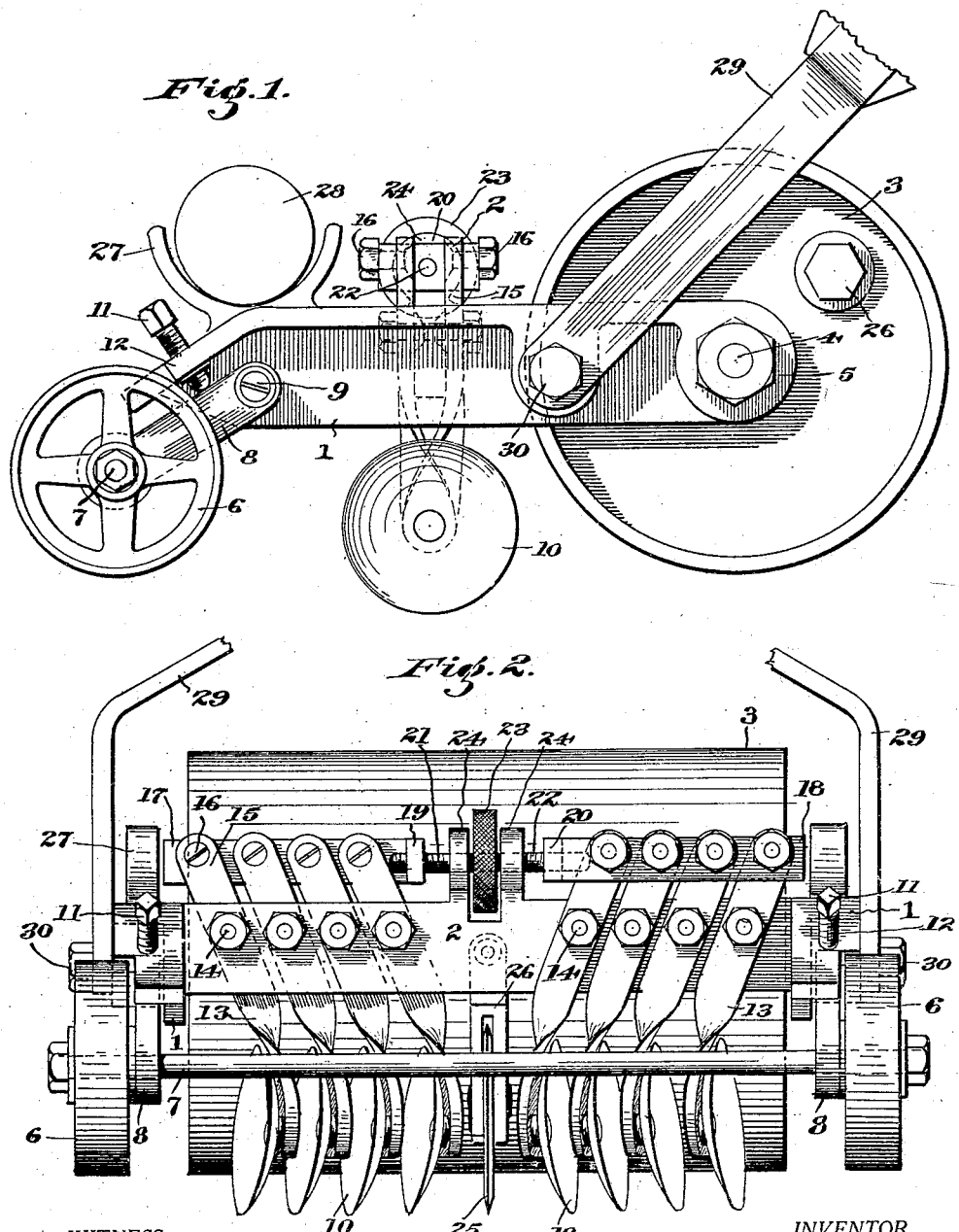

EDWARD C. LYDON, OF SAN MATEO, CALIFORNIA.

LAWN-RENOVATOR AND METHOD OF TREATING LAWNS.

1,297,198. Specification of Letters Patent. Patented Mar. 11, 1919.

Application filed April 30, 1917. Serial No. 165,394.

*To all whom it may concern:*

Be it known that I, EDWARD C. LYDON, a citizen of the United States, and a resident of the city of San Mateo, county of San Mateo, and State of California, have invented a new and useful invention, to wit, Improvements in Lawn-Renovators and Methods of Treating Lawns; and I do hereby declare the following to be a full, clear, concise, and exact description of the same.

The invention relates particularly to implements for cultivating lawns and other grass turfs.

Among the objects of this invention are to vitalize and promote heavy growth of grass in lawns, putting greens on golf links and like turf, and to renovate or revivify such grasses when below normal production.

In this specification and the annexed drawing the invention is illustrated in the form considered by me to be the best, but it is to be understood that the invention is not limited to such form, because it may be embodied in other forms, and it is also to be understood that in and by the claims following the description, it is desired to cover the invention in whatever form it may be embodied.

In the accompanying one sheet of drawings:

Figure 1 is a side elevation of a lawn renovator constructed in accordance with this invention, the operating handle being broken away.

Fig. 2 is a front elevation of the same.

Grass turfs, such as lawns, putting greens for golf links and the like, after continuous mowing and rolling becomes hard and matted to such an extent as to resist the percolation of moisture, and are strangled and suffocated by the accumulation of exposed dead surface roots and contracted stools. It is the function of this implement to open up such mats for aeration, and to permit the circulation and accumulation of moisture; to sever these root mats; to revitalize and assist the propagation of the deeper roots; to expand the stools severed by the mowing operation and encourage propagation of shoots therefrom.

In detail the construction, illustrated in the drawings includes a main frame comprising the side bars 1—1 joined by the cross bar 2, preferably an integral casting. It is obvious, however, that the frame may be built up in any desirable manner. The drum roller 3 mounted upon the shaft 4 loosely journaled in the end 5 of the main frame, acts as a wheel support for the rear end of the frame. The forward end of the main frame is supported on the gage wheels 6—6 mounted on a transverse shaft 7, and suitably journaled in the swing arms 8 pivoted at 9 to the main frame. The depth to which the cultivating disks 10 may enter the ground is determined by the adjustment of the gage wheels, controlled by the set screws 11—11 threaded in the flanges 12 of the main frame, and bearing against the swing arm 8. Screwing the set screws down depresses the gage wheels limiting the entrance of the disks 10 into the ground, the reverse action on the set screws 11 having the reverse effect, the main frame pivoting on the shaft 4 of the roller. (See Fig. 1.)

The cultivating disks 10 are arranged in a transverse series (see Fig. 2) extending across the machine in front of the roller 3. These disks are preferably concave with sharp cutting edges, the series of disks being divided in the center and having the concave faces directed in opposite directions. The plane of the disk is set slightly oblique to the line of progress and tilted slightly back from perpendicular, whereby the furrow is lifted and turned laterally to leave an open furrow, without severing the furrow slice or turning it over as in disk plowing. It is not the function of these disks to plow but only to slice the sod to the desired depth. For regulating the lifting action of the disks in slicing, the disk standards 13—13 are pivotally mounted on the cross beam 2 on the pivots 14, the upper extensions 15 of the standards being pivoted at 16 on the connecting links 17 and 18. These links have their respective ends 19 and 20 turned inwardly at right angles, and threaded to receive the threaded spindle having its end threaded right and left at 21—22 respectively. The spindle is rotated by the knurled handle 23 fixed thereon, and rotatable between the slotted uprights 24—24 on the cross bar 2. Rotation of the threaded spindle advances and retracts the links 17 and 18 synchronously, and has a like effect on the series of disks on opposite sides of the center of the implement.

As illustrated in Fig. 2, with the disk in a substantially upright position, the furrow slices are left open in the best condition to receive seed or fertilizer. With both links 17 and 18 retracted toward the center, the disks will be thrown more lateral and laid back at a greater angle from the perpendicular, which would tend to cut under to a greater extent, which action is valuable in severing the stocks and crowns of weeds, which are destroyed by such cutting. Practice has proven that the renovation as accomplished by this implement will entirely destroy weed growth, such as dandelions, daisies, and other undesirables, in which the severance of the stock or the crown is fatal, owing to the sap loss; while this action has the reverse effect upon the grass, tending to promote more profuse "stooling out" and a more compact growth above the roots, occasional splitting of which tends to the formation of new crown-stools.

To divide the center strip between the two inner disks of the opposed series, I provide the vertical pilot disk 25 mounted in the bracket 26 on the cross beam 2. The disk 25 operates in guiding and controlling the implement although it is unnecessary and may be omitted from the combination.

The furrows opened by the disks 10 are immediately closed by the roller 3, although the natural springiness of the sod prevents the roller 3 from packing the sod back to its former condition. The roller 3 is preferably formed as a water tight drum, having a filling plug 26 therein, by means of which the drum may be filled with water or any other suitable weight to increase the pressure. In very tough sods it is sometimes necessary to add weight in front of the disks 10 to insure their proper penetration. This additional weight can be applied by means of a rack 27 to receive the weight 28.

The machine is operated very much as a lawn mower and is worked in front of the operator by means of a handle having the bail connections 29—29, pivoted to the side bar 1 at 30. The implement is pushed across the lawn in parallel paths, from time to time, as conditions would indicate as necessary. In succeeding treatments the furrows are cut transversely to the prior furrow, making a checker board effect. In this manner new growth in the old furrows is not disrupted. With repeated treatment the lawn takes on a uniform, compact, velvet-like appearance of uniform growth, soft and spongy under foot and of great moisture-holding capacity, weeds being killed and entirely eliminated with no other treatment than the functioning of this implement. While this disclosure has been confined to a hand operated implement, it is obvious that it may be adapted to power traction without departing from the spirit of this invention.

Having thus described this invention what I claim and desire to secure by Letters Patent is:

1. In a lawn renovator, a frame, standards pivoted on said frame on horizontal pivots; disks on the lower ends of said standards; a bar connecting the upper ends of said standards and means on the frame for synchonously swinging said standards to adjust the disks laterally on the frame.

2. A lawn renovator including a frame having a transverse bar; concave disks mounted for lateral adjustment on said bar, the disks on opposite sides of the center of the frame facing in opposite directions, and a pilot disk mounted on said frame between the two center disks.

3. In a lawn renovator, a frame, two series of standards pivoted on said frame, disks mounted on the lower end of said standards, a bar connecting the upper ends of each series, said standards and a screw threaded in opposite directions engaging said bars for swinging said two series of standards in opposite directions to adjust the disks thereon, laterally of the frame in opposite directions.

4. In a lawn renovator, a frame, standards pivoted on said frame, a bar connecting the upper ends of said standards and a screw mounted on said frame and engaging said bar for swinging said standards to adjust disks laterally of said frame.

5. In a lawn renovator, a frame, two series of standards pivoted on said frame; disks mounted on the lower end of said standards; a bar connecting the upper ends of each series of standards; and means secured on the frame for synchronously swinging said two series of standards in opposite directions to adjust the disks thereon, laterally of the frame in opposite directions.

In testimony whereof, I have hereunto set my hand at San Mateo, California, this 24th day of April, 1917.

EDWARD C. LYDON.

In presence of—
C. M. COYLE,
BALDWIN VALE.

Copies of this patent may be obtained for five cents each, by addressing the "Commissioner of Patents, Washington, D. C."